United States Patent
Ollefs

(10) Patent No.: US 7,174,966 B2
(45) Date of Patent: Feb. 13, 2007

(54) PROCESS OF SETTING THE LENGTH OF AN UPPER STEERING ARM

(75) Inventor: Horst Ollefs, Moers (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 10/974,301

(22) Filed: Oct. 27, 2004

(65) Prior Publication Data

US 2005/0098330 A1 May 12, 2005

(30) Foreign Application Priority Data

Oct. 29, 2003 (DE) .............................. 103 50 651

(51) Int. Cl.
*A01B 59/06* (2006.01)

(52) U.S. Cl. ............................... 172/7; 172/9; 172/679

(58) Field of Classification Search .................... 172/2, 172/7–12, 677–680
See application file for complete search history.

(56) References Cited

U.S. PATENT DOCUMENTS

| 3,736,845 | A | 6/1973 | Weiste et al. |
| 4,495,577 | A | 1/1985 | Strunk et al. |
| 5,188,502 | A | 2/1993 | Tonsor et al. |
| 6,218,737 | B1 | 4/2001 | Adamek et al. |
| 6,253,859 | B1 * | 7/2001 | Coenen ....................... 172/448 |
| 6,698,524 | B2 * | 3/2004 | Bernhardt et al. ............. 172/7 |
| 2001/0007399 | A1 | 7/2001 | Adamek et al. |
| 2002/0157841 | A1 * | 10/2002 | Bernhardt et al. ............. 172/7 |

FOREIGN PATENT DOCUMENTS

| DE | 4001495 | | 4/1991 |
| DE | 19639573 A1 * | | 4/1998 |
| DE | 197 47 949 C2 | | 6/2001 |
| GB | 2 106 767 | | 4/1983 |

* cited by examiner

*Primary Examiner*—Thomas A Beach
(74) *Attorney, Agent, or Firm*—Harness, Dickey & Pierce, P.L.C.

(57) ABSTRACT

A process of setting the length of an upper steering arm of an attaching device of a tractor. The attaching device includes the upper steering arm with a power drive provided for length setting purposes; a length sensor to determine the actual length of the upper steering arm; two lower steering arms with a lifting mechanism to lift and lower the lower steering arm; a lift sensor to determine the actual position of lift of the steering unit; as well as a control unit. The nominal lengths of the upper steering arm (7), to be determined as a function of the directions of movement of the lifting mechanism, are stored in the control unit. Determining the actual length of the upper steering arm (7), the actual position of lift of the lifting mechanism and the direction of movement of the lifting mechanism. Comparing the actual length with the nominal length stored for the direction of movement and for the actual position of lift as determined, and actuating the power drive (27) for setting the length of the upper steering arm (7) to the nominal length if the actual length deviates from the nominal length.

7 Claims, 5 Drawing Sheets

length … continues …

PROCESS OF SETTING THE LENGTH OF AN UPPER STEERING ARM

CROSS-REFERENCE TO RELATED APPLICATIONS

This application claims priority to German Patent Application No. 10350651.9, filed Oct. 29, 2003, which application is herein expressly incorporated by reference.

FIELD OF THE INVENTION

The invention relates to a process of setting the length of an upper steering arm of an attaching device of a tractor. The attaching device includes the upper steering arm with a power drive provided for length setting purposes. A length sensor determines the actual length of the upper steering arm. Two lower steering arms, with a lifting mechanism, lift and lower the lower steering arms. A lift sensor determines the actual position of lift of the lifting mechanism. A control unit affects the operation.

BACKGROUND OF THE INVENTION

A prior art process of setting the length of an upper steering arm is shown in German Patent No. DE 197 47 949 C2. Here, the actual length of the upper steering arm is determined by a length sensor and the position of lift of the lifting mechanism is determined by a lift sensor. For each lift position, a nominal length of the upper steering arm is stored. The actual length of the upper steering arm is compared with the nominal length. If the two values deviate, a power drive is actuated which moves the upper steering arm to its nominal length. An attached implement is thus lowered and lifted with identical movement sequences. However, when used with soil working implements, this process can lead to non-optimum treatment of the soil.

Further processes for setting the length of an upper steering arm are shown in U.S. Pat. No. 5,188,502. This patent deals with setting the length of two upper steering arms of a construction machine. With one described process, one or several positions can be set automatically from any starting position. The movement from the starting position to the stored end position is continuously calculated. Depending on the starting position, different movement sequences can take place into the end position. Furthermore, the implement can be lifted and lowered in parallel without pivoting the implement.

SUMMARY OF THE INVENTION

In accordance with the invention, a tractor includes an attaching device which comprises an upper steering arm with a power drive to provide length settings. A length sensor determines the actual length of the upper steering arm. Two lower steering arms include a lifting mechanism to lift and lower the lower steering arms. A lift sensor determines the actual position of lift of the lifting mechanism. The process of setting the length of an upper steering arm of an attaching device of a control unit links the parts together. A tractor comprises the steps of providing nominal lengths of the upper steering arm, the nominal lengths are stored in the control unit as a function of positions of lift and directions of movement of the lifting mechanism to be determined; determining the actual length of the upper steering arm; determining the actual position of lift of the lifting mechanism; determining the direction of movement of the lifting mechanism; comparing the actual length with the stored nominal length for the direction of movement to be determined and for the actual position of lift to be determined; and controlling the power drive for setting the length of the upper steering arm to the nominal length if the actual length deviates from the nominal length.

When using a plow for example, it is possible, when lifting the plow, to place it into a steep position as late as possible. Further, when lowering the plow, it is possible to lower the plow in a steep position in order to improve its furrowing of the soil. Further, nominal lengths for the direction of movement of lifting the lifting mechanism for the positions of lift to be determined are stored in a memory of the control unit in the form of a first characteristic curve. Also, the nominal lengths for the direction of movement of lowering the lifting mechanism for the positions of lift to be determined are stored in the memory in the form of a second characteristic curve. The first characteristic curve deviates from the second characteristic curve.

Accordingly, the speed at which the upper steering arm is set, starting from a lowered position of the lifting mechanism, at least over part of the lifting path to a lifted position of the lifting mechanism, is limited during the lifting phase. This enables the maximum hydraulic conveying power for the lifting mechanism to be available. This is of particular interest in those cases where the maximum hydraulic conveying power of the hydraulic system is not designed to operate both the upper steering arm and the lifting mechanisms at maximum power.

The upper steering arm can be manually set by an operative to achieve a floating position where the length of the upper steering arm can be set freely. If a signal is relieved by the control unit from the operating unit, the upper steering arm is freely movable with respect of its length.

Furthermore, the setting of the floating position can be dependent upon the position of lift. Accordingly, releasing information is provided to the effect that a floating path is to be set at the upper steering arm if the position of lift to be determined is within a certain stored range of the position of lift. Furthermore, the actual position of lift of the lifting mechanism is determined whereupon the actual position of lift is compared with the range of positions of lift stored for the releasing information. The upper steering arm is released so that the upper steering arm is freely movable with respect of its length if the actual position of lift is within the range of positions of lift stored for the releasing information.

To delimit the floating path of the upper steering arm, the control unit is provided with nominal lower length limits and nominal upper length limits as a function of the positions of lift of the lifting mechanism to be determined. The release of the upper steering arm and the actuation of the power drive take place so that the upper steering arm, with respect to its lengths, is freely movable between the nominal lower length limits and the nominal upper length limits. Thus, this ensures that the floating path is delimited by the hydraulic mechanism without the need to provide mechanical stops.

A limit value is stored in the control unit to ensure that the floating path cannot be set when an implement is lifted. Such lifting would result in the implement being articulated while the floating path is being set. This could cause damage to the attaching device and to the implement. The limit value stored in the control unit represents the maximum force acting on the upper steering arm. At this maximum force, the upper steering arm can be released to achieve a floating path. An actual value, which represents the force acting on the upper steering arm, is determined and compared with the limit value. The upper steering arm is released only if the actual value is lower than the limit value. When a hydraulic upper steering arm is used, it is possible to measure, as a representative value, the actual value of the hydraulic pressure in a cylinder of the upper steering arm. The pressure corresponds to a force at the upper steering arm which loads the upper steering arm towards longer lengths. If the pressure, and thus the force at the upper steering arm is too high, this means that the implement has been lifted and, during the release of the upper steering arm, would pivot downwardly in an uncontrolled way.

The inventive process can be loaded in the form of a computer program into the control unit and executed by the control unit. In addition, the process can be made available on a computer program product, such as a CD ROM.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
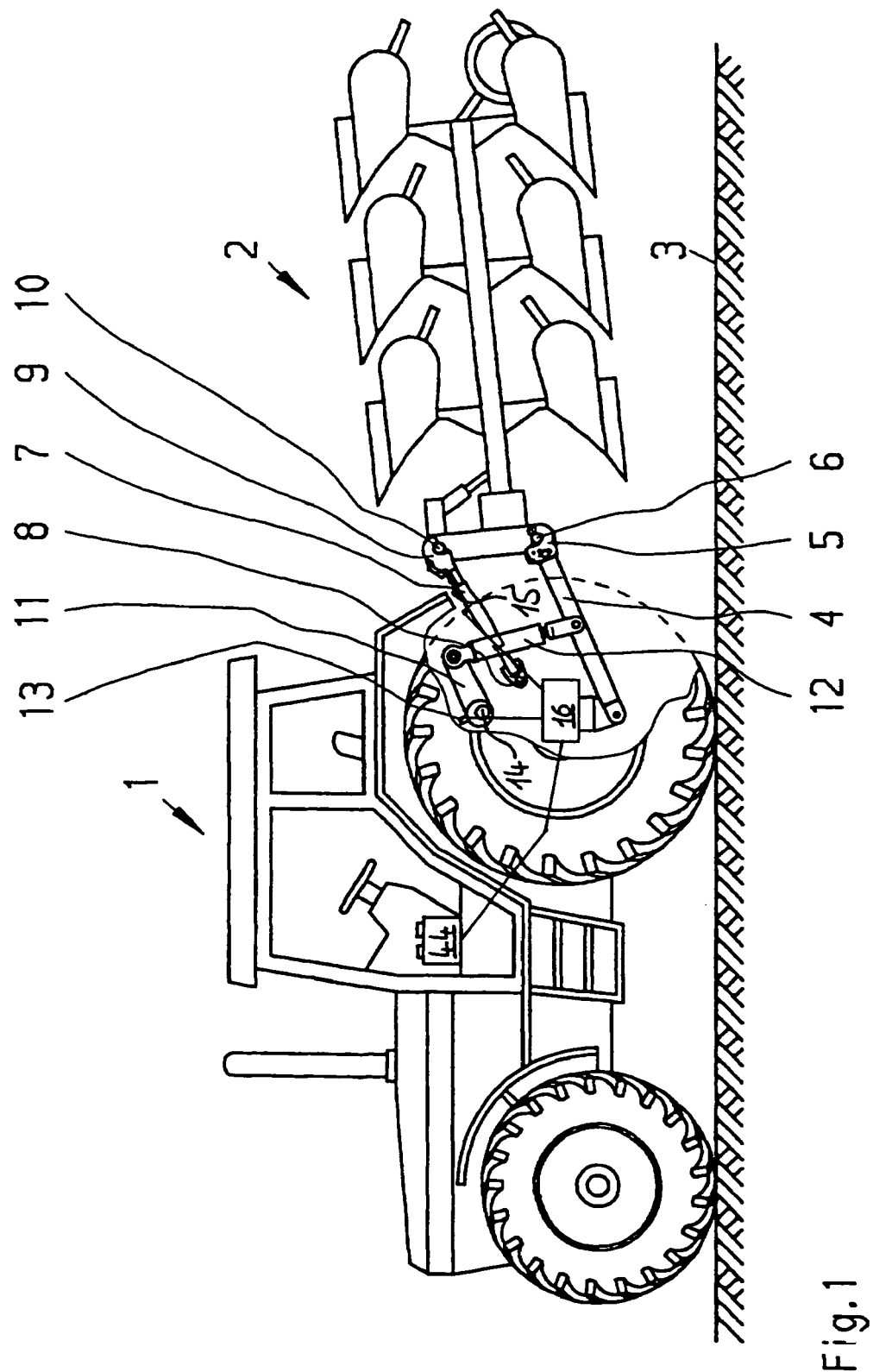
FIG. 1 is a diagrammatic illustration view of a tractor with an implement attached to the attaching device of the tractor.

FIG. 1 shows a tractor 1 with an attached implement 2. The tractor 1 can be driven on soil which can be worked by the implement 2. Two lower steering arms 4, which are arranged side by side, are provided at the rear of the tractor 1. The two lower steering arms are articulatably connected to the tractor 1 and at the upper end of each is secured with a coupling hook 5. FIG. 1 shows only one of the two lower steering arms 4. The coupling hooks 5 of the lower steering arms 4 are connected to suitable coupling mechanisms 6 of the implement 2. An upper steering arm 7 is connected via a jointed connection 8 to the rear of the tractor above the two lower steering arms 4. At its free end, the upper steering arm 7 includes a coupling hook 9 which provides a connection with a coupling mechanism 10 of the implement 2.

The lower steering arms 4 are each connected by a lifting strut 12 to a lifting arm 11. The lifting arms 11 are rotated by a driveshaft 14 to lift or lower the lower steering arms. The lifting arms 11 and the driveshaft 14 form a lifting mechanism whose setting with respect to height, is recorded by a lift sensor 13. The lift sensor 13 determines the rotational position of the driveshaft 14. The lift sensor 13 can be provided on one or both of the lower steering arms 4 to measure the angular position of the lower steering arms 4 relative to the rear of the tractor. The upper steering arm 7 is associated with a length sensor 15. The length sensor 15 determines the actual length of the upper steering arm 7. The lift sensor 13 and the length sensor 15 are connected to a control unit 16 in which the recorded data is further processed. Furthermore, a power drive is connected to the upper steering arm 7. The power drive is likewise connected to the control unit 16. Thus, the upper steering arm 7 can be actuated by the control unit 16. An operating unit 44 is provided to effect manual setting of the control unit 10. The operating unit 44 is connected to the control unit 16.

Figure 2:
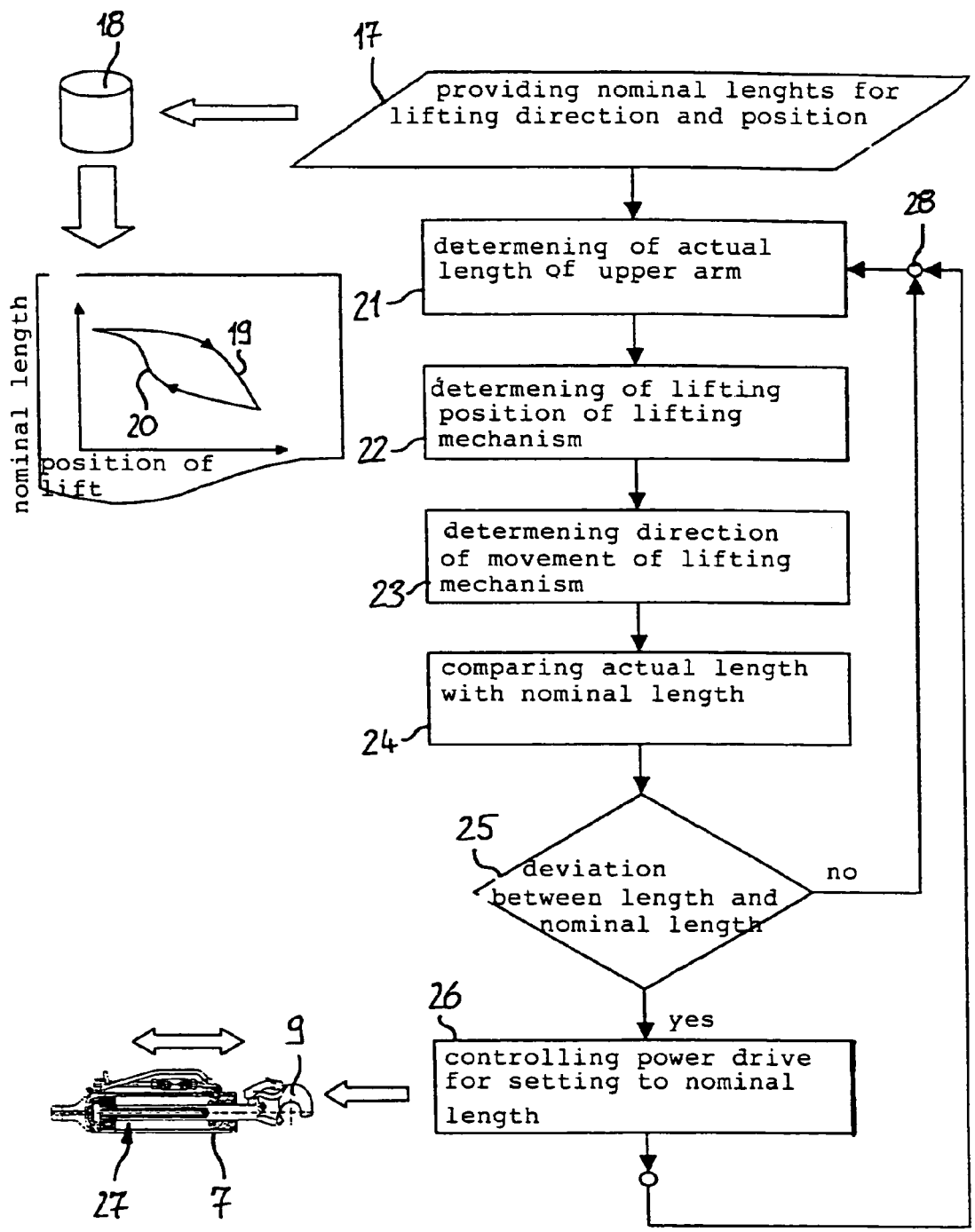
FIG. 2 is a flow diagram of the inventive process.

FIG. 2 shows a flow diagram of the process in accordance with the invention. At process stage 17, the required data is stored and made available. Nominal length value of the upper steering arms with respect to different positions of lift and both directions of movement of the lifting mechanism, lowering or lifting of the lifting mechanism, are stored in a memory 18 of the control unit. For example, it is possible to provide two different characteristic curves 19, 20 for lifting or lowering the lifting mechanism. If, for example, when using a plow, the plow is to be lowered in a steep position in order to improve the carving of the plow and if, during the lifting operation, it should be possible for initially only the lifting mechanism to be operated, with the upper steering arm 7 being shortened after the completion of the lifting operation in order to place the plow into a steep position, it is possible to store two different characteristic curves 19 and 20. The subsequent shortening of the upper steering arm 7, after the implement has been lifted, is advantageous. This is due to, initially, the entire hydraulic power being available and can be used for lifting purposes. Only after completion of the lifting operation is the hydraulic power made available to the upper steering arm 7, thus permitting quick lifting of the plow.

The actual length of the upper steering arm 7 is determined during process stage 21. The actual position of lift of the lifting mechanism is measured by the lift sensor during process stage 22. The measured data is passed onto the control unit where, during process stage 23, the direction of movement of the lifting mechanism is measured, for example, by making a comparison with previously measured positions of lift of the lifting mechanism. However, it is also possible to use special sensors for this purpose.

The determined actual length of the upper steering arm 7 is compared to the stored nominal length, which is stored for the determined actual position of lift and for the determined direction of movement of the lifting mechanism (process stage 24). During process stage 25 it is decided whether the actual length deviates from the stored nominal length. If this is not the case, the process continues with process stage 21. However, if a deviation has occurred, the power drive of the upper steering arm 7, in process stage 26, is controlled so that the latter assumes the nominal length position.

The upper steering arm 7 is preferably a hydraulically actuated steering arm. The steering arm comprises a double-acting hydraulic cylinder 27. Thus, it is possible for the length of the upper steering arm 7 to be adjusted via the hydraulic system to any value.

The process stage 25 and the process stage 26, in connecting point 28, can be followed by further process stages which will be explained below. Thereafter, the process is continued by process stage 21.

Figure 3:
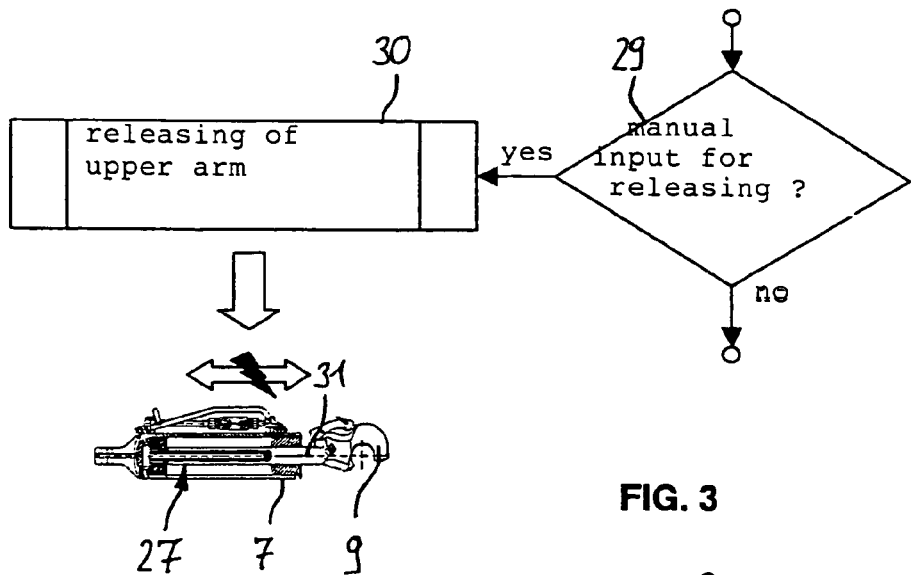
FIG. 3 is a flow diagram of the process stages for manually setting a floating position at the upper steering arm.

FIG. 3 shows a flow diagram with process stages referring to the manual setting of a floating position of the upper steering arm 7. In connecting point 28, according to FIG. 2, the process can follow the process shown in FIG. 2. In accordance with process stage 29, the question is asked as to whether the system has been switched manually to a floating position. The manual switching can be effected by an operative switching of the operating unit. If such a manual input has been effected, the upper steering arm 7 is released. Thus, depending on the position of the implement, the length of the upper steering arm 7 can be freely set. The process stage 30, for releasing the upper steering arm 7, can be replaced by further process stages, as will be explained later. For example, in order to release the upper steering arm 7, the hydraulic cylinder 27 can be connected to a hydraulic tank and thus disconnected by a hydraulic pump. Accordingly, a piston rod 31, connected to the coupling hook 9 of the upper steering arm 7, is able to move freely.

Figure 4:
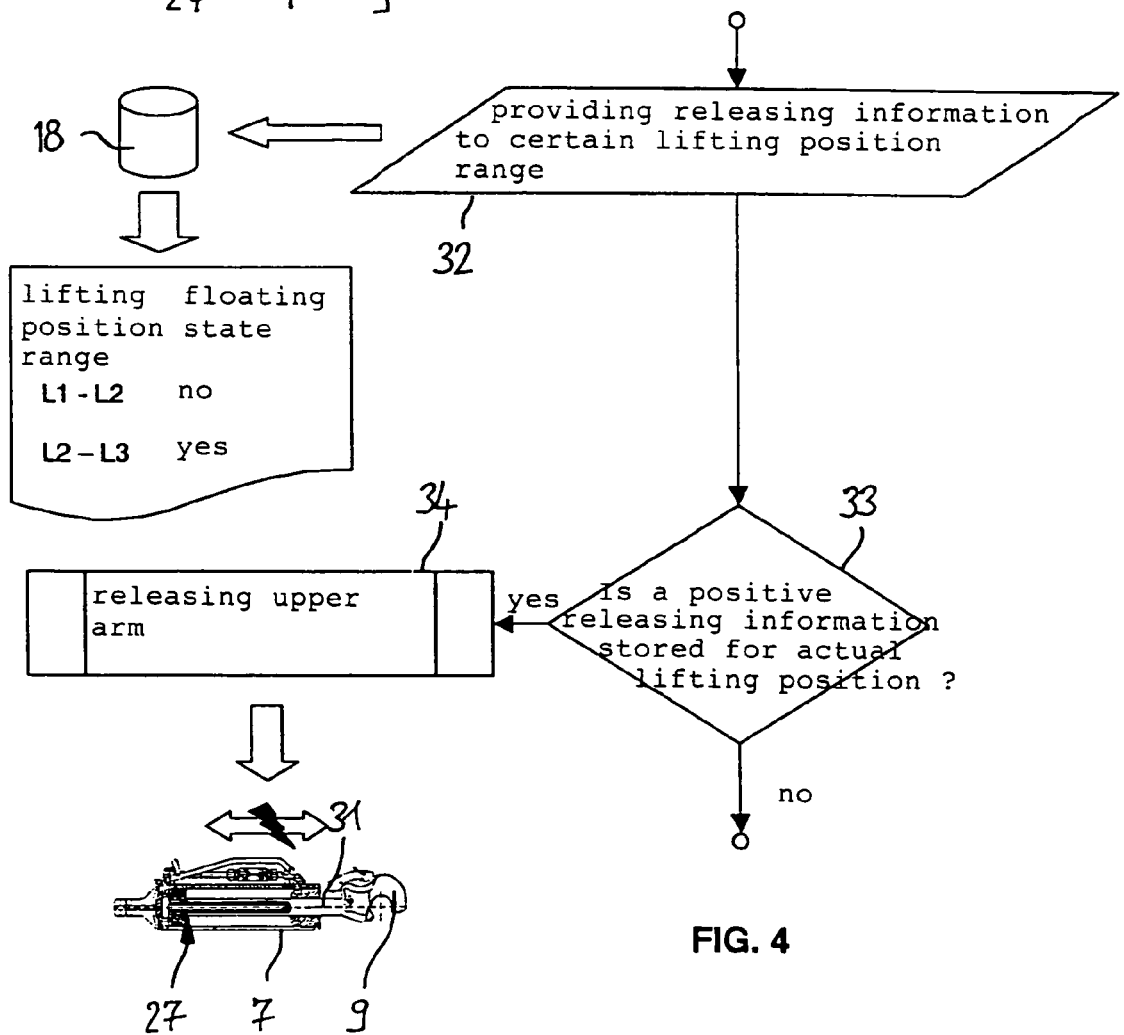
FIG. 4 is a flow diagram of the process stages for automatically setting a floating position at the upper steering arm.

FIG. 4 shows a flow diagram with the process stages for automatically releasing the upper steering arm 7 and thus for automatically setting a floating position of the upper steering arm 7. Again, these process stages can follow in connecting point 28, according to FIG. 2 the process stages shown in FIG. 2. The process stages can also follow the process stages according to FIG. 3.

Initially, in process stage 32, data is made available and stored in memory 18 of the control unit. The data indicates in which position of lift of the lifting mechanism a floating position of the upper steering arm 7 should be set. For this purpose, releasing information is stored for certain ranges of positions of lift. The releasing information can be a "yes" information or "no" information for certain ranges of position of lift. The actual position of lift of the lifting mechanism is determined in process stage 33. The information is examined in process stage 34 to determine whether the actual position of lift, as determined, falls within a range of positions of lift for which a positive or negative releasing information has been stored. If a positive releasing information has been stored, the upper steering arm 7 is released in process stage 35. The release corresponds to that according to FIG. 3 and can contain further process stages. If no positive releasing information has been stored, the release of the upper steering arm 7 does not take place and the process continues.

Figure 5:
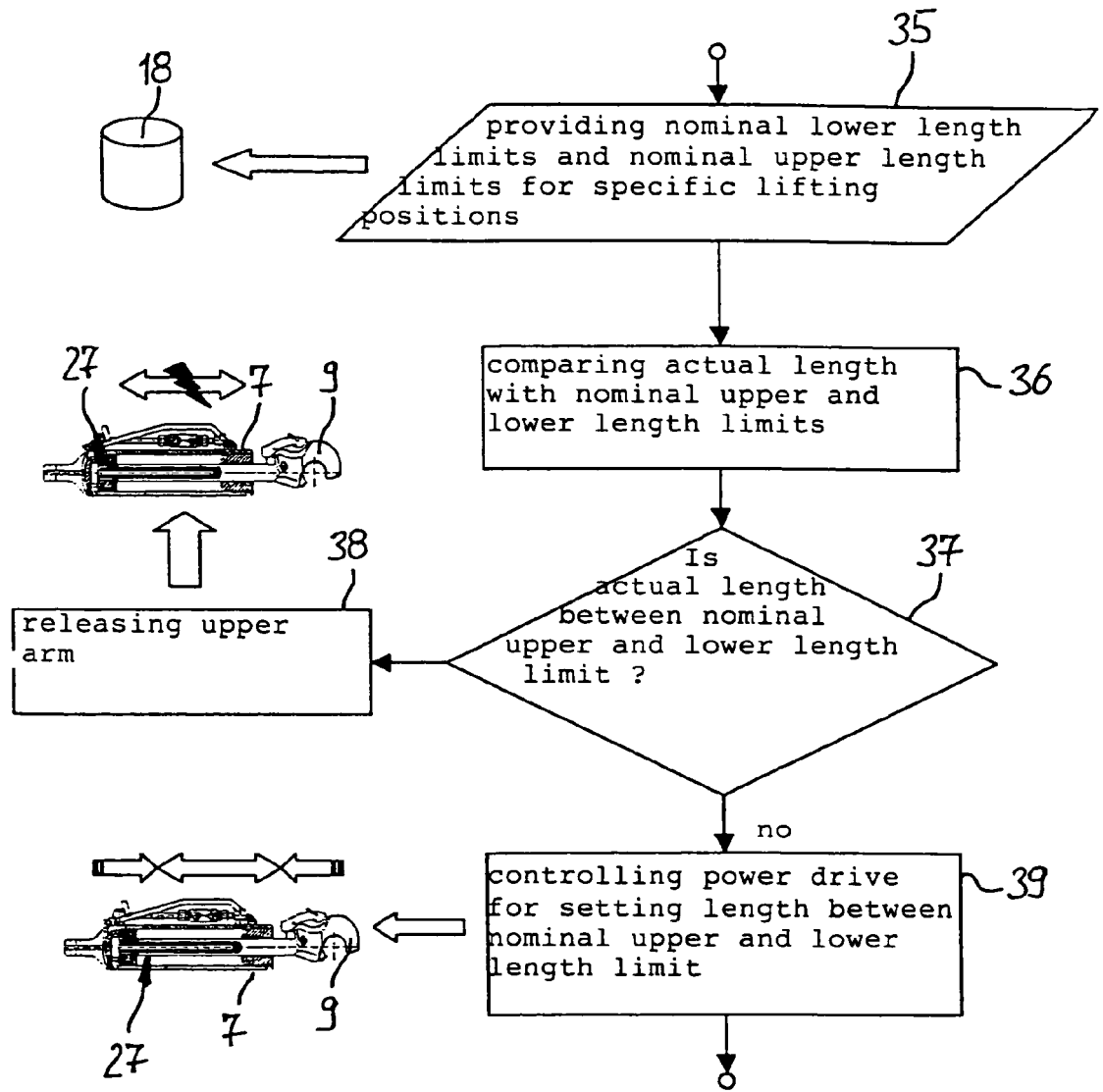
FIG. 5 is a flow diagram of the process stages for setting a limited floating path.

The above-defined process stages for releasing the upper steering arm according to FIGS. 3 and 4 can be represented by the following process stages according to FIG. 5. The process stages serve to delimit the floating path of the upper steering arm 7. For this purpose, a nominal lower length limit and a nominal upper length limit are provided in process stage 36 and stored in memory 18 of the control unit. The nominal lower length limit and the nominal upper length limit can be accurately defined or vary, depending on the position of lift. In process stage 37, the actual length is examined to determine whether it is located between the nominal lower length limit and the nominal upper length limit. If this is the case, the upper steering arm 7 is released in accordance with process stage 38. Thus, the upper steering arm 7 can be set to any length. If the actual length is not located between the nominal lower length limit and the nominal upper length limit, the upper steering arm 7 is not released. Instead, the power drive of the upper steering arm 7 is controlled in process stage 39 so that it assumes a length which is located between the nominal lower length limit and the nominal upper length limit. Thereafter, the process is continued.

Figure 6:
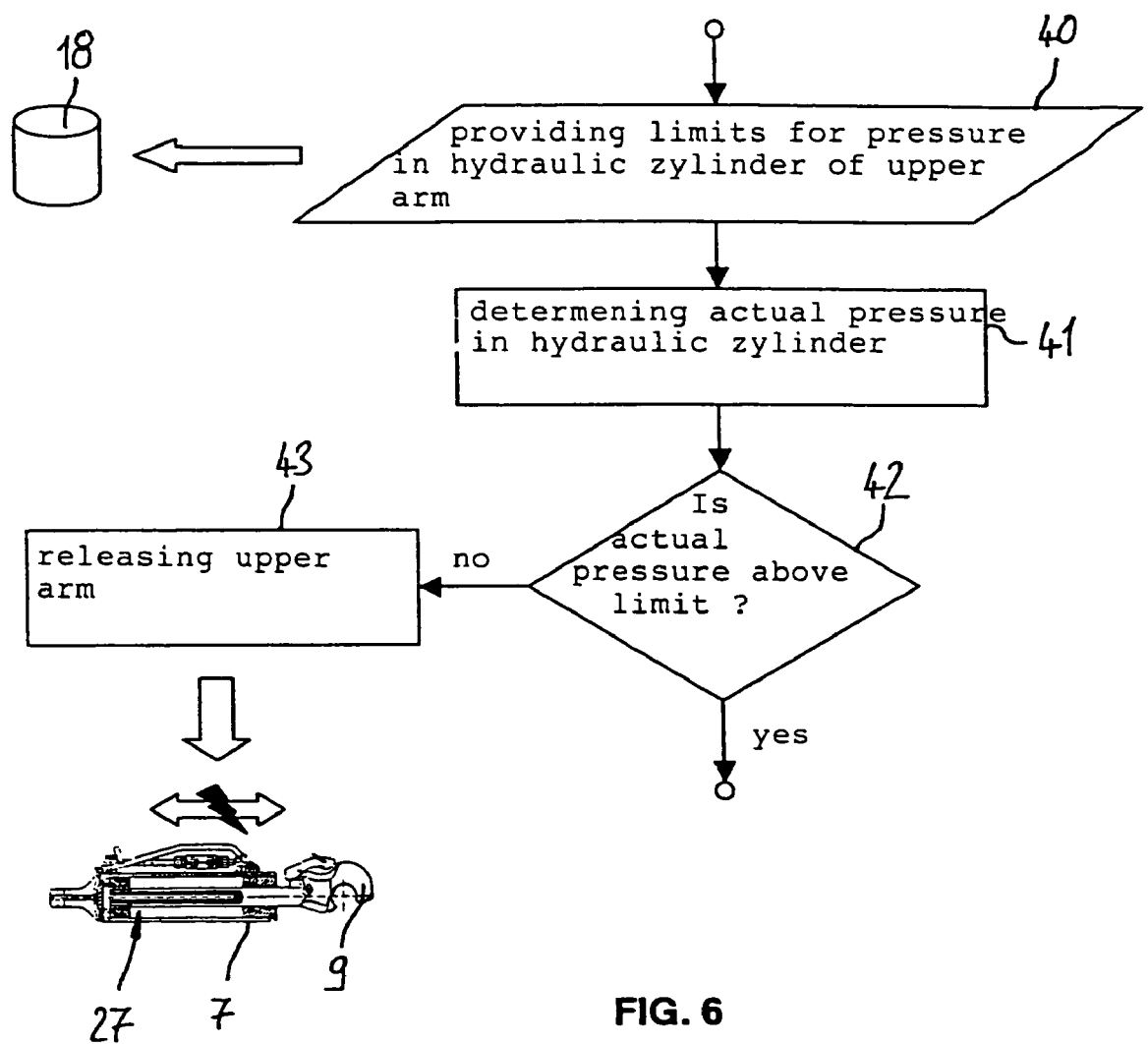
FIG. 6 is a flow diagram of the process stages for initializing the system prior to setting a floating position at the upper steering arm.

Before the upper steering arm 7 is released in accordance with the process stages according to FIGS. 3, 4 or 5, a system check is conducted in accordance with the process stages shown in the flow diagram according to FIG. 6. It is examined whether the upper steering arm 7 can be released in order to avoid uncontrolled downward pivoting of the implement, when the implement is lifted off the ground for example. First, in process stage 40, a limit value is made available in the memory 18 of the control unit. The limit value corresponds to the force acting on the upper steering arm 7. In the case of a hydraulic upper steering arm 7 with a double-acting hydraulic cylinder 27, it is possible for a limit value for the pressure in the hydraulic cylinder to be made available. Thereafter, the actual value is measured in process stage 41. If a hydraulic upper steering arm is used, the actual value is the pressure in the hydraulic cylinder. In accordance with process stage 42, it examines whether the pressure in the hydraulic cylinder is above or below the limit value. If the limit value is exceeded, this indicates that a high tensile force is acting on the upper steering arm 7. Consequently, if the upper steering arm 7 is released, the implement would pivot downwards in an uncontrolled way. Therefore, if the limit value is exceeded, it is impossible for the upper steering arm 7 to be released. However, if the limit value is not reached, the upper steering arm can be released (process stage 43).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A process of setting the length of an upper steering arm of an attaching device of a tractor, wherein the attaching device comprises the upper steering arm with a power drive provided for length setting purposes, a length sensor for determining the actual length of the upper steering arm, two lower steering arms with a lifting mechanism for lifting and lowering the lower steering arms, a lift sensor for determining the actual position of lift of the lifting mechanism, as well as a control unit, said process comprising:
   providing nominal lengths of the upper steering arm in a memory of said control unit, said nominal lengths are stored in the control unit as a function of positions of lift and directions of movement of the lifting mechanism to be determined;
   determining the actual length of the upper steering arm;
   determining the actual position of lift of the lifting mechanism;
   determining the lifting direction of movement or the lowering direction of movement of the lifting mechanism;
   comparing the actual length with the stored nominal length for the lifting or lowering direction of movement to be determined and for the actual position of lift to be determined; and
   controlling the power drive for setting the length of the upper steering arm to the nominal length if the actual length deviates from the nominal length.

2. A process according to claim 1, further comprising storing in said memory nominal lengths for the direction of movement of lifting the lifting mechanism for the positions of lift to be determined in the form of a first characteristic curve and storing nominal lengths for the direction of movement of lowering the lifting mechanism for the positions of lift to be determined in the form of a second characteristic curve and said first characteristic curve deviates from the second characteristic curve.

3. A process according to claim 2, wherein the first characteristic curve is shaped in such a way that the speed at which the upper steering arm is set, starting from a lowered position of the lifting mechanism, at least along part of the lifting path, to a raised position of the lifting mechanism, is limited during the lifting operation.

4. A process according to claim 1, further comprising releasing the upper steering arm so that with respect to its length said upper steering arm is freely movable when a signal is sent from an operating unit to the control unit.

5. A process according to claim 4, further comprising storing releasing information in the control unit so that a floating path should be set at the upper steering arm if the position of lift to be determined is within a certain stored range of positions of lift, comparing the actual position of lift with the range of stored positions of lift for the releasing information, and releasing the upper steering arm so that the upper steering arm, with respect to its length, is freely movable if the actual position of lift is within the range of stored positions of lift for the releasing information.

6. A process according to claim 5, further comprising storing a nominal lower length limit and a nominal upper length limit in the control unit as a function of the positions of lift of the lifting mechanism to be determined, releasing the upper steering arm and controlling the power drive so that the upper steering arm, with respect to its length, is freely movable between the nominal lower length limit and the nominal upper length limit stored for the actual position of lift.

7. A process according to claim 6, further comprising storing a limit value in the control unit and said limit value represents the maximum force which acts on the upper steering arm and at which the upper steering arm can be released for the purpose of achieving a floating path, determining an actual value which represents the force acting on the upper steering arm, comparing the actual value with the limit value, and releasing the upper steering arm only if the actual value is below the limit value.

* * * * *